United States Patent [19]

Kluna et al.

[11] Patent Number: 4,488,628
[45] Date of Patent: Dec. 18, 1984

[54] FLUID FRICTION CLUTCH WITH ACTUATOR

[75] Inventors: Vlastimil Kluna, Kornwestheim; Werner Hummel, Affalterbach, both of Fed. Rep. of Germany

[73] Assignee: Sueddeutsche Kuhlerfabrik Julius Fr. Behr GmbH & Co. KG, Stuttgart, Fed. Rep. of Germany

[21] Appl. No.: 415,926

[22] Filed: Sep. 8, 1982

[30] Foreign Application Priority Data

Sep. 14, 1981 [DE] Fed. Rep. of Germany ....... 8126744

[51] Int. Cl.³ .................... F16D 25/06; F16D 35/00
[52] U.S. Cl. .................... 192/58 B; 192/85 A; 192/88 A
[58] Field of Search .............. 192/58 B, 82 T, 88 A, 192/85 A; 251/61; 92/106, 93, 99

[56] References Cited

U.S. PATENT DOCUMENTS

| | | | |
|---|---|---|---|
| 2,586,617 | 2/1952 | Danly | 192/88 A |
| 3,323,623 | 6/1967 | Roper | 192/58 B |
| 3,358,566 | 12/1967 | Palmer | 251/61 X |
| 3,458,020 | 7/1969 | Lutz | 192/58 B |
| 3,880,265 | 4/1975 | Elmer | 192/58 B |
| 4,051,937 | 10/1977 | Garrett et al. | 192/88 A |
| 4,060,158 | 11/1977 | Kikuchi | 192/82 T |
| 4,062,432 | 12/1977 | Evans | 192/82 T X |
| 4,176,630 | 12/1979 | Elmer | 192/82 T X |
| 4,270,641 | 6/1981 | Nonnenmann et al. | 192/82 T |
| 4,310,084 | 1/1982 | Nonnenmann | 192/82 T X |
| 4,355,710 | 10/1982 | Schilling | 192/82 T X |
| 4,405,039 | 9/1983 | Hauser | 192/58 B |

FOREIGN PATENT DOCUMENTS

| | | | |
|---|---|---|---|
| 1199335 | 12/1959 | France | 92/106 |
| 897090 | 5/1962 | United Kingdom | 192/88 A |
| 915819 | 1/1963 | United Kingdom | 192/82 T |

*Primary Examiner*—Rodney H. Bonck
*Attorney, Agent, or Firm*—Schwartz, Jeffery, Schwaab, Mack, Blumenthal & Koch

[57] ABSTRACT

A fluid friction clutch comprising a rotatable assembly comprising a clutch housing member and a clutch cover member defining a working chamber therein, the working chamber being connected with a working fluid reservoir, valve lever means in said reservoir for controlling the admission of working fluid from the reservoir to the working chamber where it serves to transfer torque between a rotatable disc disposed in the working chamber and said rotatable assembly, means for actuating the valve lever means comprising a pressure chamber formed from a pressure chamber housing and a flexible membrane carrying a pressure plate which directly engages the valve lever means, the pressure chamber housing and membrane being joined to the rotatable assembly to rotate therewith, and means for introducing a pressure medium such as compressed air into said pressure chamber to actuate the valve lever means and control the admission of working fluid from the reservoir into the working chamber, said pressure medium introducing means comprising a connecting fitting pivotably mounted on the pressure chamber housing.

13 Claims, 2 Drawing Figures

FLUID FRICTION CLUTCH WITH ACTUATOR

BACKGROUND OF THE INVENTION

The present invention relates to a fluid friction clutch comprising a rotatable assembly having a working chamber connected with a working fluid reservoir, the presence of working fluid in said working chamber serving to transfer torque between said rotatable assembly and a rotatable disc disposed in said working chamber. More particularly, the present invention relates to a fluid friction clutch with valve means for controlling the admission of working fluid to said working chamber from a working fluid reservoir and with pressure-responsive means for actuating said valve means.

A fluid friction clutch of the foregoing general type is disclosed in U.S. Pat. No. 4,176,630 (see FIGS. 5 and 6). This known fluid friction clutch has the disadvantage that the actuator mechanism requires two bearings, i.e. a radial bearing and an axial bearing, and a tappet or push rod. As a result of this structure, the fluid friction clutch assembly is more massive than is desirable, and the clutch assembly is also relatively expensive.

SUMMARY OF THE INVENTION

Accordingly, it is the object of the present invention to provide an improved fluid friction clutch and actuator therefor.

Another object of the invention is to provide a fluid friction clutch and actuator wherein the actuator requires only a single bearing.

It is also an object of the present invention to provide a fluid friction clutch with actuator which is very compact.

A further object of the present invention is to provide a fluid friction clutch with a pressure-responsive actuator exhibiting a high degree of operating safety and reliability.

Yet another object of the present invention is to provide a fluid friction clutch with an actuator which can be produced at low cost.

A still further object of the present invention is to provide a fluid friction clutch with a pressure-responsive actuator having a low operating inertia and exhibiting rapid response.

These and other objects of the invention are achieved by providing a fluid friction clutch comprising a rotatable assembly comprising a working chamber connected with a working fluid reservoir, the presence of working fluid in said working chamber serving to transfer torque between a rotatable disc disposed in said working chamber and said rotatable assembly, valve lever means for controlling the admission of working fluid from said reservoir to said working chamber, means for actuating said valve lever means comprising a pressure chamber comprising a pressure chamber housing and a flexible membrane, said pressure chamber housing and said membrane being fixedly joined to said rotatable assembly to rotate therewith, said membrane carrying a pressure plate bearing directly against said valve lever means in operative association therewith to actuate said valve lever means, and means for introducing a pressure medium into said pressure chamber comprising a connecting fitting pivotably mounted on said pressure chamber housing.

In further preferred aspects of the invention, the valve lever means opens to admit working fluid to the working chamber when the pressure chamber is pressurized; the rotatable assembly comprises a clutch housing member and a clutch cover member; the periphery of the membrane is clamped between the assembled clutch housing and clutch cover members; the working fluid reservoir constitutes part of the rotatable assembly; the valve lever means is disposed in the working fluid reservoir; the pressure chamber and the working fluid reservoir are separated by a plate having an orifice therethrough and the membrane of the pressure chamber projects through the orifice into operative contact with the valve lever means in the working fluid reservoir, and the pivotably mounted connecting fitting on the pressure chamber housing remains stationary while the pressure chamber housing rotates with the rotatable assembly.

As a result of the novel structure of the presently claimed invention, only a single radial bearing is required for the rotatable assembly so that the actuator, and consequently the fluid friction clutch, is comparatively short and can be easily fit into the limited space available for its installation.

The smaller number of parts in the device of the invention reduces the mass of the moving parts so that the actuator will have a smaller operating inertia. This feature is particularly important because it enables the clutch to be responsive to very rapid actuating movements which occur, for example, during cyclic operation of the valve lever means, i.e. when the valve lever means is only opened or only closed. In the preferred structure of the invention, the mounting of the pressure chamber membrane is especially simple and secure, thereby contributing both to the reduced overall dimensions of the device and also to the operating reliability. The reduced number of parts in the device of the invention, compared to prior designs, also contributes to the reduction in size of the device as well as to the low production cost.

BRIEF DESCRIPTION OF THE DRAWINGS

The invention will be explained in further detail with reference to the accompanying drawings, wherein.

DETAILED DESCRIPTION OF PREFERRED EMBODIMENTS

Figures 1, 2:
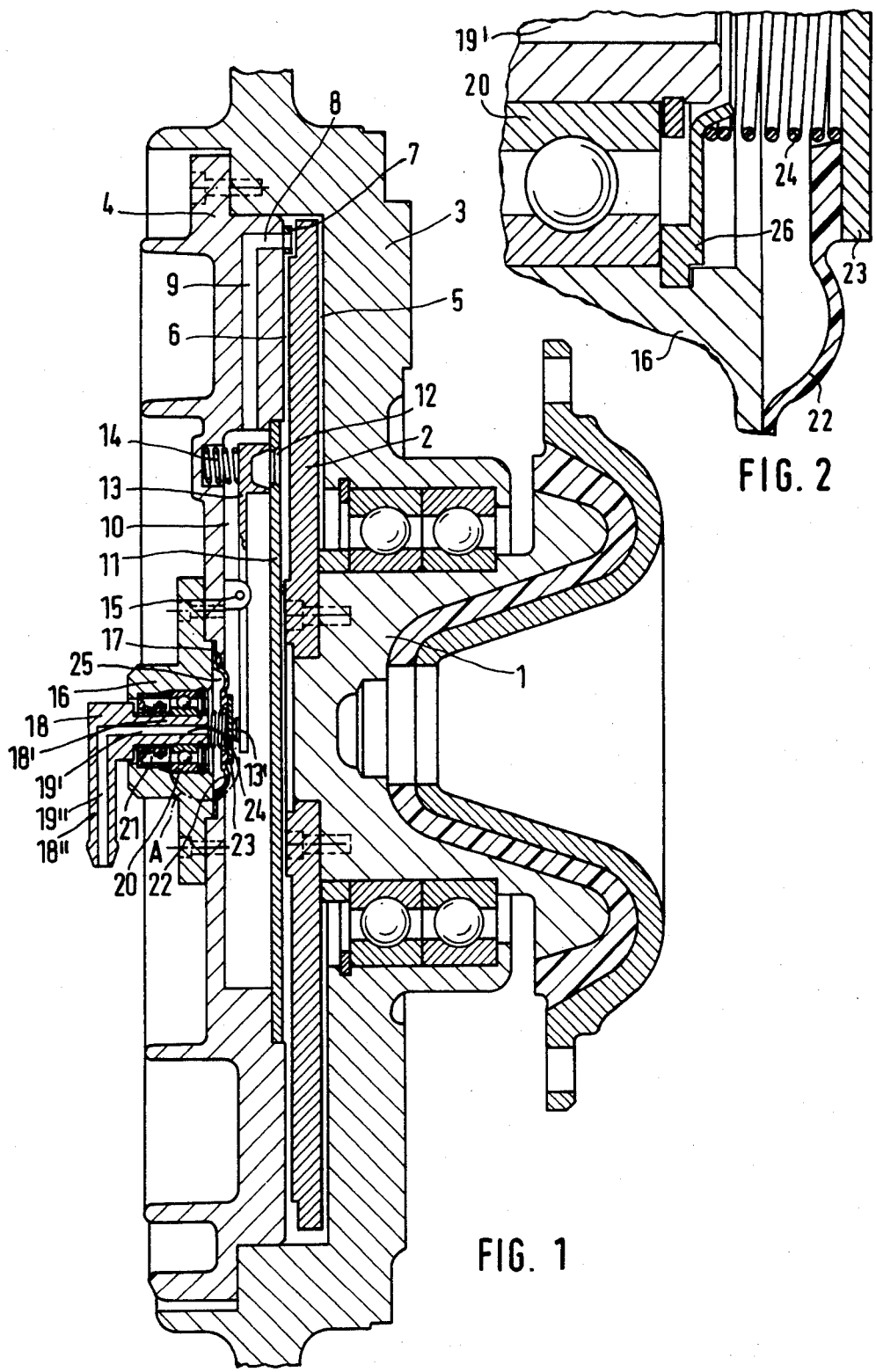
FIG. 1 is a sectional elevation view of a preferred embodiment of fluid friction clutch and actuator therefor according to the present invention.
FIG. 2 is an enlarged detail view of a preferred embodiment of the actuator used in the invention.

FIG. 1 illustrates a fluid friction clutch comprising a drive flange 1 which carries the so-called primary disc 2. The primary disc is disposed in a working chamber of a rotatable assembly comprising a clutch housing 3 and a clutch cover 4 secured to the clutch housing. The clutch housing and clutch cover assembly is rotatably mounted on the drive flange by means of bearings. The working chamber or working space of the rotatable assembly comprises gaps 5 and 6 across which torque is transmitted between the disc 2 and the rotatable assembly as the disc rotates. In operation, the gaps 5 and 6 are filled with a viscous working fluid, and the magnitude of the torque which is transmitted between the rotating disc and the rotatable assembly depends upon the degree to which the gaps are filled with the working fluid. From the working chamber, the viscous working fluid is moved through a pump element 7 and through connecting return channels 8 and 9 to a working fluid reservoir 10 in the rotatable assembly. Working fluid reservoir 10 is separated from the working chamber by a partition 11 having a valve opening or valve bore 12 therethrough. Valve lever means 13 is provided for opening and closing valve opening 12 through partition 11. The valve lever 13 is pivotably supported in a pivotable mounting 15 disposed on the side of reservoir 10 formed by clutch cover 4. The pivotable valve lever 13 is urged by means of a compression spring 14 into the closed position in which it is seated against partition 11 surrounding valve opening 12, thereby blocking off the valve opening. The other end of the valve lever 13 is provided with a rounded or dome-shaped contact piece 13', through which the valve lever means is actuated by the actuator as described hereinafter.

The actuator comprises a pressure chamber housing 16 fixedly joined to clutch cover 4 by means of bolts (not shown) so that the pressure chamber housing will rotate with the clutch cover, i.e. with the rotatable assembly. The actuator further comprises a membrane 22, the periphery of which is tightly clamped between the clutch cover member and the pressure chamber housing. Membrane 22 has a bellows portion which projects through an orifice 17 through clutch cover member 4 into the working fluid reservoir 10. Membrane 22 further carries in its center a pressure plate 23 which rests against the dome-shaped contact piece 13' of valve lever 13.

The pressure chamber housing 16 also carries a connecting fitting 18 which is pivotably mounted thereon by means of ball bearing 20 and which serves to connect the pressure chamber with a source of pressure medium, e.g. compressed air. A sealing gasket 21 of the type used to seal rotating shafts, is provided between connecting fitting 18 and pressure chamber housing 16 so that a pressure chamber 25 is formed by the pressure chamber housing 16, the membrane 22 and the gasket 21. The connecting fitting 18 comprises a trunion portion 18' pivotably mounted in ball bearing 20 and sealing gasket 21 and an angled connecting portion 18". Both the trunion portion 18' and the angled connecting portion 18" are provided with communicating axial bores 19' and 19", respectively, so that a passageway is formed through the connecting fitting which opens at one end into the pressure chamber 25 and which can be connected at its other end to a pressure medium supply line (not shown). A compression spring 24 disposed inside pressure chamber 25 urges the pressure plate 23 on membrane 22 against the dome-shaped contact piece 13' on valve lever means 13. In the illustrated embodiment, the relative strengths of springs 14 and 24 are chosen so that valve lever means 13 is normally closed when pressure chamber 25 is unpressurized.

FIG. 2 is an enlarged detail view showing pressure plate 23 on membrane 22 and compression spring 24 disposed between pressure plate 23 and a support piece 26 mounted on pressure chamber housing 16.

The fluid friction clutch and actuator of the present invention operate as follows. In order to actuate or engage the clutch, the valve lever means 13 must be lifted from the valve opening 12 so that the viscous working fluid can pass from the working fluid reservoir 10 into the working space defined by gaps 5 and 6. This is effected by forcing compressed air from a compressed air source through the channel in connecting piece 18 formed by the communicating axial bores 19" and 19' into pressure chamber 25. The increased pressure in pressure chamber 25, in turn, forces membrane 22 and pressure plate 23 mounted thereon to move to the right in the drawing, i.e. against the contact piece 13' of valve lever means 13. Valve lever means 13 thus pivots, thereby lifting the valve member from valve opening 12. So long as the pressure chamber 25 is pressurized, the valve opening 12 will remain open. Working fluid can thus pass from the reservoir 10 into the working space between disc 2 and the rotatable assembly so that torque will be transmitted from the disc to the rotatable assembly. Devices to be rotated, such as a pulley or fan blades (not shown), can be attached to the rotatable assembly.

When the clutch is to be disengaged, valve opening 12 is closed by valve lever means 13 to interrupt the flow of the viscous working fluid from the working fluid reservoir into the working chamber of the clutch. This is done by venting or depressurizing pressure chamber 25 to reduce the force against membrane 22 and pressure plate 23. Spring 14 is thereby permitted to urge the valve lever 13 against partition 11 so that the valve member closes valve opening 12. Pressure plate 23 is maintained in contact with contact piece 13' on valve lever 13 by compression spring 24 which is disposed between pressure plate 23 and a support piece 26 mounted on pressure chamber housing 16.

As a result of its structure, the actuator used with the fluid clutch of the invention has a relatively low operating inertia and is especially suitable for use in control processes in which the valve lever means is opened and closed abruptly, i.e. in a so-called cycle control process. Discrete portions of the viscous operating fluid are thereby supplied at various time intervals to the working chamber. Nevertheless, a quasi constant rate of rotation is produced on the drive side of the clutch.

The actuator used with the fluid clutch of the present invention may be operated either with a gas or with a liquid as the pressure medium. With suitable structural modifications to the mounting of the valve lever means and the strength and arrangement of the valve and membrane springs, it may also be operated with a pressure medium under reduced pressure.

It is also within the scope of the invention to construct an embodiment in which the valve lever means is closed when the pressure chamber is pressurized and opens when the pressure chamber is vented or depressurized so that the clutch is engaged when the pressure chamber is depressurized.

It is further within the scope of the invention to modify the disclosed embodiment to make the pressure chamber housing 16 integral with the clutch cover member 4. In such a case, membrane 22 may be secured to the clutch cover, for example, by means of an annular disc.

The foregoing description of preferred embodiments has been set forth merely to illustrate the invention and is not intended to be limiting. Since further modifications of the disclosed embodiments incorporating the spirit and substance of the invention may occur to persons skilled in the art, the scope of the invention should be limited solely with respect to the appended claims and equivalents.

We claim:
1. A fluid friction clutch comprising:
   a rotatable assembly comprising a working chamber connected with a working fluid reservoir, the presence of working fluid in said working chamber serving to transfer torque between a rotatable disc disposed in said working chamber and said rotatable assembly;

valve lever means for controlling the admission of working fluid from said working fluid reservoir to said working chamber;

means for actuating said valve lever means comprising a pressure chamber comprising a pressure chamber housing and a flexible membrane, said pressure chamber housing and said flexible membrane being fixedly joined to said rotatable assembly to rotate therewith, and said membrane carrying a pressure plate bearing directly against said valve lever means in operative association therewith to actuate said valve lever means, and means for introducing a pressure medium into said pressure chamber comprising a connecting fitting pivotably mounted on said pressure chamber housing.

2. A fluid friction clutch according to claim 1, wherein said valve lever means opens to admit working fluid from said reservoir into said working chamber when said pressure chamber is pressurized.

3. A fluid friction clutch according to claim 1, wherein said rotatable assembly comprises a clutch housing member and a clutch cover member fixedly joined to each other.

4. A fluid friction clutch according to claim 3, wherein said flexible membrane is joined to said pressure chamber housing by clamping the periphery of said membrane between said pressure chamber housing and said clutch cover member.

5. A fluid friction clutch according to claim 1, wherein said working fluid reservoir is disposed within said rotatable assembly.

6. A fluid friction clutch according to claim 5, wherein said valve lever means is disposed within said working fluid reservoir.

7. A fluid friction clutch according to claim 6, wherein said pressure chamber housing rotates with said rotatable assembly and said pivotably mounted connecting fitting is stationary.

8. A fluid friction clutch according to claim 1, wherein said connecting fitting is mounted on said pressure chamber housing by means of a ball bearing and sealed thereto by means of a sealing gasket.

9. A fluid friction clutch according to claim 8, wherein said connecting fitting comprises a trunion portion supported in said ball bearing and said sealing gasket and an angled connecting portion, said trunion portion and said angled connecting portion being provided with connecting axial bores forming a channel communicating between the interior of said pressure chamber and the free end of said angled connecting portion.

10. A fluid friction clutch according to claim 1 further comprising spring means disposed between said membrane and said pressure chamber housing for urging the pressure plate on said membrane into contact with said valve lever means.

11. A fluid friction clutch according to claim 1, wherein said membrane comprises a bellows portion which extends into said working fluid reservoir.

12. A fluid friction clutch according to claim 11, wherein said valve lever means comprises a lever having first and second ends, a valve portion at one end of said lever, and a contact portion at the other end of said lever, said lever being pivotally mounted at a central portion between said ends in said working fluid reservoir, said contact portion being aligned with and directly contacting said pressure plate carried by said membrane, and said valve portion blocking off a valve opening through a partition separating said working fluid reservoir from said working chamber when said one end of said lever is pivoted toward said partition.

13. A fluid friction clutch according to claim 12, further comprising a first spring means for urging said pressure plate against said contact portion of said lever in a direction to open the valve, and a second spring means for urging said valve portion of said lever against said partition in a direction to close the valve; the relative strength of said second spring means against said lever being greater than that of said first spring means.

* * * * *